US010955033B2

(12) United States Patent
Iuga et al.

(10) Patent No.: US 10,955,033 B2
(45) Date of Patent: Mar. 23, 2021

(54) LINEAR ACTUATOR

(71) Applicant: Eaton Intelligent Power Limited, Dublin (IE)

(72) Inventors: Ioan Iuga, Caledonia, MI (US); Peter Foote, Kentwood, MI (US)

(73) Assignee: Eaton Intelligent Power Limited, Dublin (IE)

( * ) Notice: Subject to any disclaimer, the term of this patent is extended or adjusted under 35 U.S.C. 154(b) by 47 days.

(21) Appl. No.: 16/585,112

(22) Filed: Sep. 27, 2019

(65) Prior Publication Data

US 2020/0103008 A1 Apr. 2, 2020

Related U.S. Application Data

(60) Provisional application No. 62/739,937, filed on Oct. 2, 2018.

(51) Int. Cl.
*F16H 25/20* (2006.01)

(52) U.S. Cl.
CPC .................................. *F16H 25/20* (2013.01)

(58) Field of Classification Search
CPC .. F16H 25/20; F16H 25/2009; F16H 25/2003; F16H 2025/2012
See application file for complete search history.

(56) References Cited

U.S. PATENT DOCUMENTS

| | | | | |
|---|---|---|---|---|
| 3,534,626 A * | 10/1970 | Elliott | ................. | F16H 25/2009 74/424.77 |
| 4,210,033 A * | 7/1980 | Erikson | ............... | F16H 25/2009 411/324 |
| 4,751,411 A * | 6/1988 | Fukaya | ............... | F16H 25/2003 310/49.18 |
| 4,790,201 A * | 12/1988 | Gheddo | ............... | B62D 33/067 74/89.37 |
| 4,974,464 A * | 12/1990 | Erikson | ............... | F16H 25/2003 74/409 |
| 6,253,657 B1 * | 7/2001 | Cartwright | ............... | B62D 5/12 180/438 |
| 6,880,424 B2 * | 4/2005 | McMillen | ................. | F16C 1/16 74/500.5 |
| 8,960,031 B2 * | 2/2015 | Keech | .................. | F16H 25/205 74/89.26 |
| 9,790,969 B2 * | 10/2017 | Fenn | ....................... | F16H 25/20 |
| 9,845,853 B2 * | 12/2017 | Chamorro Gonzalez-Tablas | ........ | B64C 13/505 |
| 9,975,574 B2 * | 5/2018 | Ohashi | ..................... | B62D 3/12 |
| 10,024,406 B2 * | 7/2018 | Stensgaard | ......... | F16H 25/2204 |
| 10,024,450 B2 * | 7/2018 | Been | ....................... | F16H 25/20 |
| 10,228,046 B2 * | 3/2019 | Parmar | ................... | F16H 57/08 |
| 10,611,404 B2 * | 4/2020 | Ohashi | .................... | F16F 1/445 |

(Continued)

FOREIGN PATENT DOCUMENTS

DE 102011119946 A1 6/2013
WO 2011/134799 11/2011

OTHER PUBLICATIONS

EP Search Report, EP 19200936, dated Jan. 20, 2020.

*Primary Examiner* — David M Fenstermacher
(74) *Attorney, Agent, or Firm* — Fishman Stewart PLLC

(57) ABSTRACT

An actuator may include a housing, a ball screw engaged with the housing, a tie rod disposed in the ball screw, a plurality of friction springs in the ball screw and around the tie rod, and a bearing having an interference fit with the tie rod and a clearance fit with the ball screw.

20 Claims, 5 Drawing Sheets

(56) References Cited

U.S. PATENT DOCUMENTS 10,626,967 B2 * 4/2020 Spyche, Jr. ............. F16H 25/20
10,787,195 B2 * 9/2020 Asakura ................ F16C 35/067
10,801,594 B2 * 10/2020 Burgess .............. F16H 25/2204

* cited by examiner

US 10,955,033 B2

LINEAR ACTUATOR

CROSS-REFERENCE TO RELATED APPLICATIONS

This application claims priority to U.S. Provisional Patent Application No. 62/739,937, filed on Oct. 2, 2018, the contents of which are herein incorporated by reference in its entirety.

TECHNICAL FIELD

The present disclosure generally relates to linear actuators, including linear actuators that may be used in connection aircraft, such as with aircraft flaps, trim components, and/or stabilizers.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some actuators do not provide any indication that primary or backup components have failed, and/or it may be difficult to determine if primary or backup components have failed.

There is a desire for solutions/options that minimize or eliminate one or more challenges or shortcomings of linear actuators. The foregoing discussion is intended only to illustrate examples of the present field and should not be taken as a disavowal of scope.

SUMMARY

In embodiments, an actuator may include a housing, a ball screw engaged with the housing, a tie rod disposed in the ball screw, a plurality of friction springs in the ball screw and around the tie rod, and/or a bearing that may be interference fit with the tie rod and clearance fit with the ball screw.

The foregoing and other aspects, features, details, utilities, and/or advantages of embodiments of the present disclosure will be apparent from reading the following description, and from reviewing the accompanying drawings.

DETAILED DESCRIPTION

Figure 1:
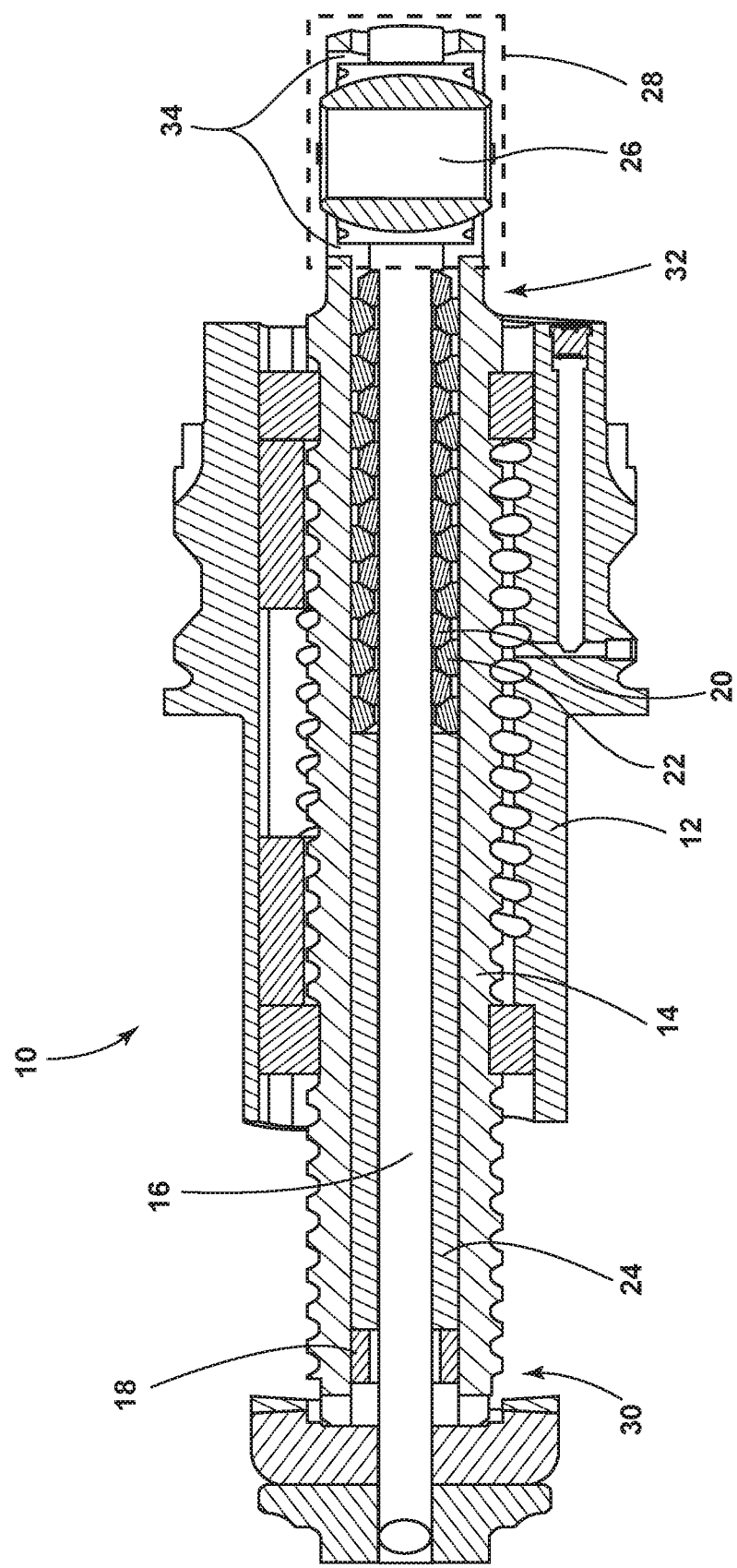
FIG. 1 is a cross-sectional view generally illustrating an embodiment of a linear actuator according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1-4, an actuator 10 may include a housing 12, a ball screw 14, a tie rod 16, an adjusting nut 18, inner friction springs 20, outer friction springs 22, a spacer 24, and/or a bearing 26. The actuator 10 may be connected to an external component 28, such as an aircraft structure.

With embodiments, the ball screw 14 may be disposed at least partially in the housing 12. The ball screw 14 may be engaged with the housing 12 such that rotation of one of the ball screw 14 and the housing 12 (or one or more components thereof) may cause translation of the other of the ball screw 14 and the housing 12. The ball screw 12 may include a first end 30 and a second end 30. The bearing 26 may be disposed at or about the second end 32 of the ball screw 14.

Figure 6:
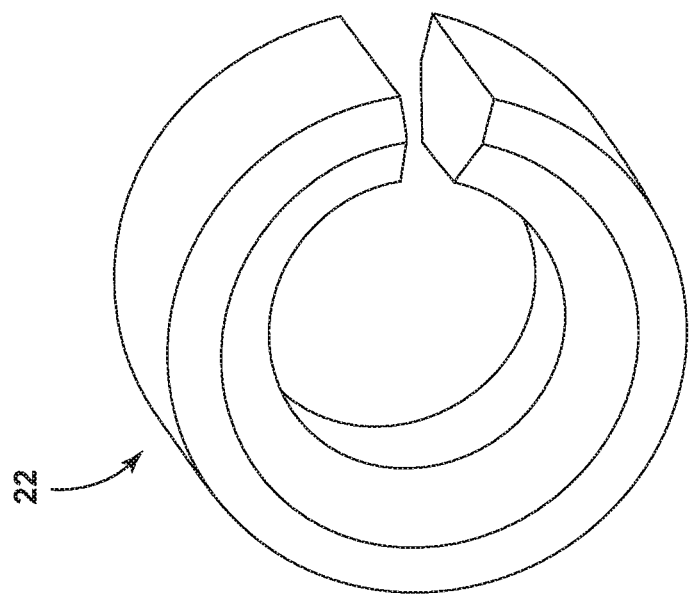
FIG. 6 is a perspective view generally illustrating an embodiment of an outer friction spring of a linear actuator according to teachings of the present disclosure.
Figure 5:
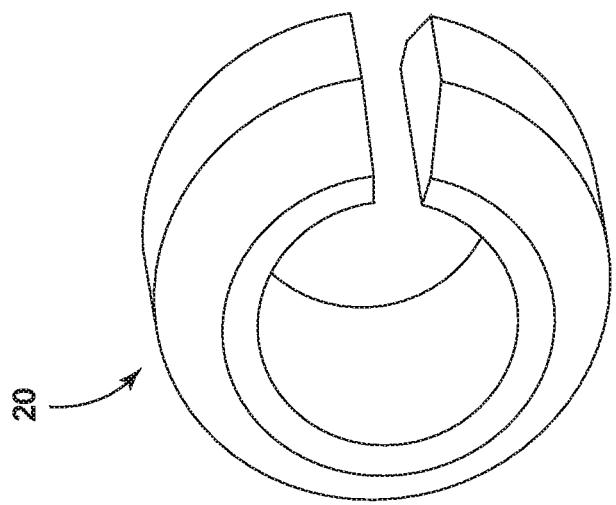
FIG. 5 is a perspective view generally illustrating an embodiment of an inner friction spring of a linear actuator according to teachings of the present disclosure.

In embodiments, the friction springs 20, 22 may be disposed in the ball screw 14 and/or disposed around the tie rod 16. The friction springs 20, 22 may include one or more of a variety of shapes, sizes, configurations, and/or materials. For example and without limitation, as seen in FIGS. 5 and 6, the friction springs 20, 22 may include C-shaped configurations. The outer friction springs 22 may include larger outer diameters than the inner friction springs 20. The outer friction springs 22 and the inner friction springs 20 may be disposed in an alternating configuration along the tie rod 16.

With embodiments, a spacer 24 may be disposed in the ball screw 14 and may extend from the adjusting nut 18 to the friction springs 20, 22. The spacer 24 may be configured to facilitate compression/loading of the friction springs 20, 22.

In embodiments, an adjusting nut 18 may be disposed in the ball screw 14, such as at or about the first end 30 of the ball screw 14. The adjusting nut 18 may include external threads that may engage internal threads of the ball screw. The adjusting nut may be tightened, which may compress the friction springs 20, 22, such as via the spacer 24 (e.g., rotation of the adjusting nut 18 may cause translation of the spacer 24, which may compress the friction springs 20, 22). Compressing the friction springs 20, 22 may include the outer friction springs 22 expanding, which may generate an interference between the ball screw 14 inner diameter, the outer diameter of the outer friction springs 22, and the inner friction springs 20. The inner friction springs 20 may collapse, which may create interference between the tie rod 16 outer diameter, the inner friction springs 20, and the outer friction springs 20.

With embodiments, a bearing 26 may be interference fit with the tie rod 16. The bearing 26 may be clearance fit with the ball screw 14. The clearance may provide a gap 34 that may provide an indication of a failure of the tie rod 16 and/or of the ball screw 14 (e.g., if the gap 34 is no longer present). A ring may be disposed in the gap 34 between the bearing 26 and the ball screw 14 to maintain the gap during loading of the friction springs 20, 22.

Figure 2:
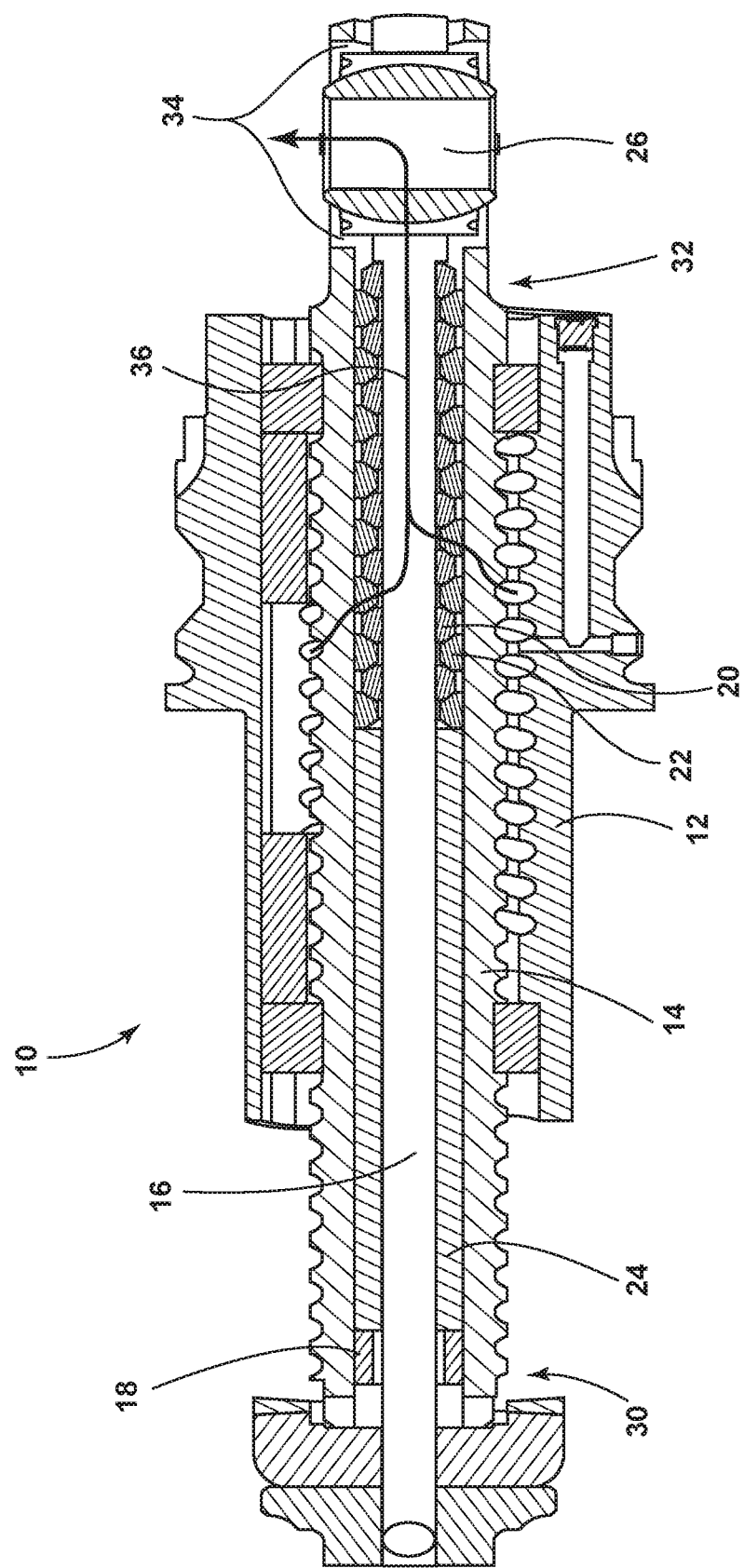
FIG. 2 is a cross-sectional view generally illustrating an embodiment of a linear actuator according to teachings of the present disclosure.

In embodiments, such as generally illustrated in FIG. 2, a primary load path 36 may include the ball screw 14, the outer friction springs 22, the inner friction springs 20, the tie rod 16, and the bearing 26. During normal operation, loads may be transferred via the primary load path 36 (e.g., from the ball screw 14 to the outer friction springs 22, to the inner friction springs 20, to the tie rod 16, to the bearing 26, and into the aircraft structure). The primary load path 34 may not include portions of the tie rod 16 or the ball screw 14 between the first end 30 of the ball screw 14 and the friction springs 20, 22. Additionally or alternatively, the primary load path 36 may not include portions of the tie rod 16 or the ball screw 14 between the second end of the ball screw 14 and the friction springs 20, 22.

Figure 3:
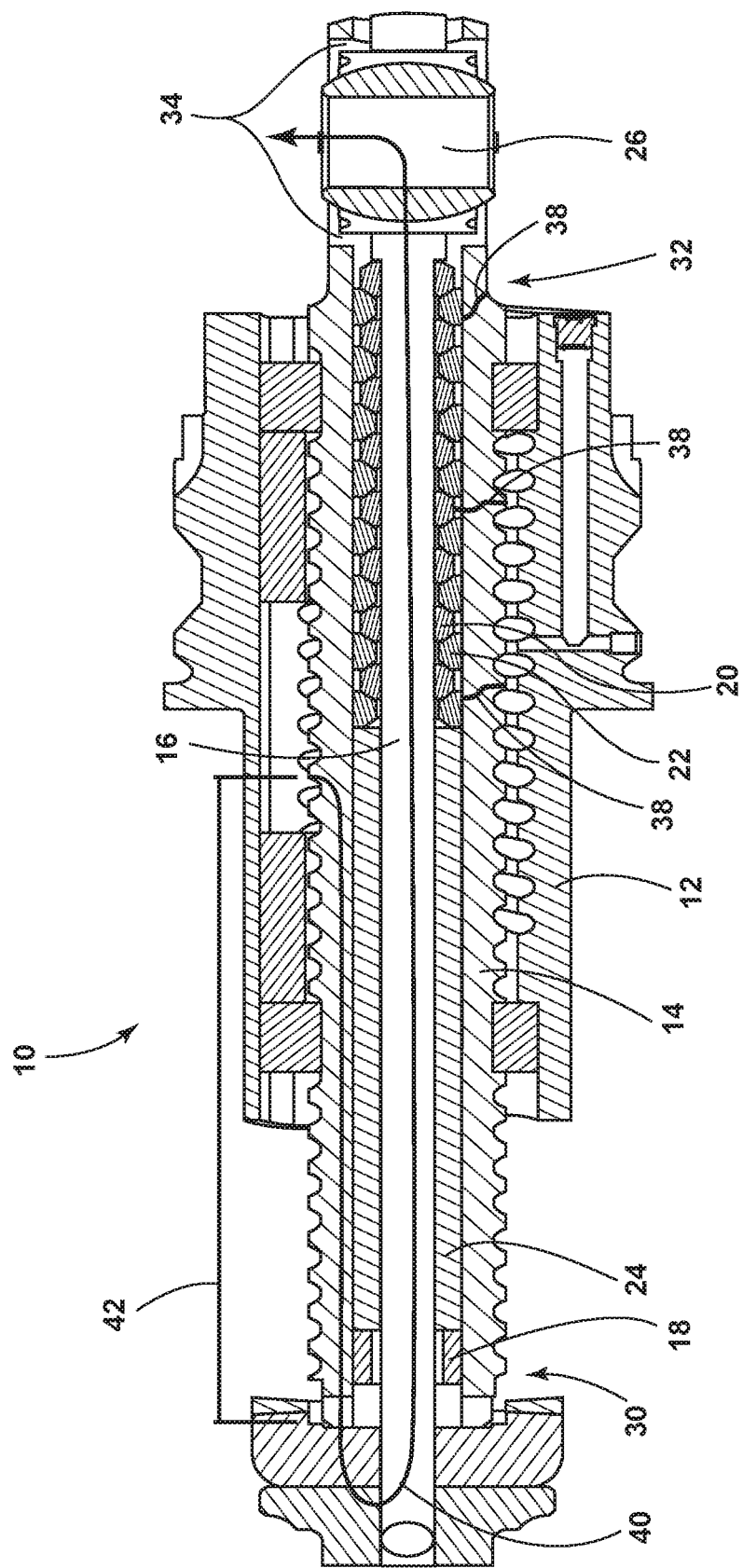
FIG. 3 is a cross-sectional view generally illustrating an embodiment of a linear actuator with a fractured ball screw according to teachings of the present disclosure.

With embodiments, such as generally illustrated in FIG. 3, in the event of a failure of the ball screw 14 (e.g., one or more fractures 38 along the ball screw 14), the friction springs 20, 22 may no longer be compressed (or may be compressed to a lesser degree) and may not divert/transfer loads from the ball screw 14 to the tie rod 16. In such an event, the gap 34 between the ball screw 14 and the bearing 26 may close, which may provide a visual indication of a failure in the primary load path 36. The tie rod 16 may be intact and may be configured to maintain a connection between the actuator 10 and the aircraft structure 28 (e.g., loads may be transferred via a first secondary load path 40). The first secondary load path 40 may include the bearing 26, the tie rod 16, and/or an intact portion 42 of the ball screw 14, and may not include the friction springs 20, 22.

Figure 4:
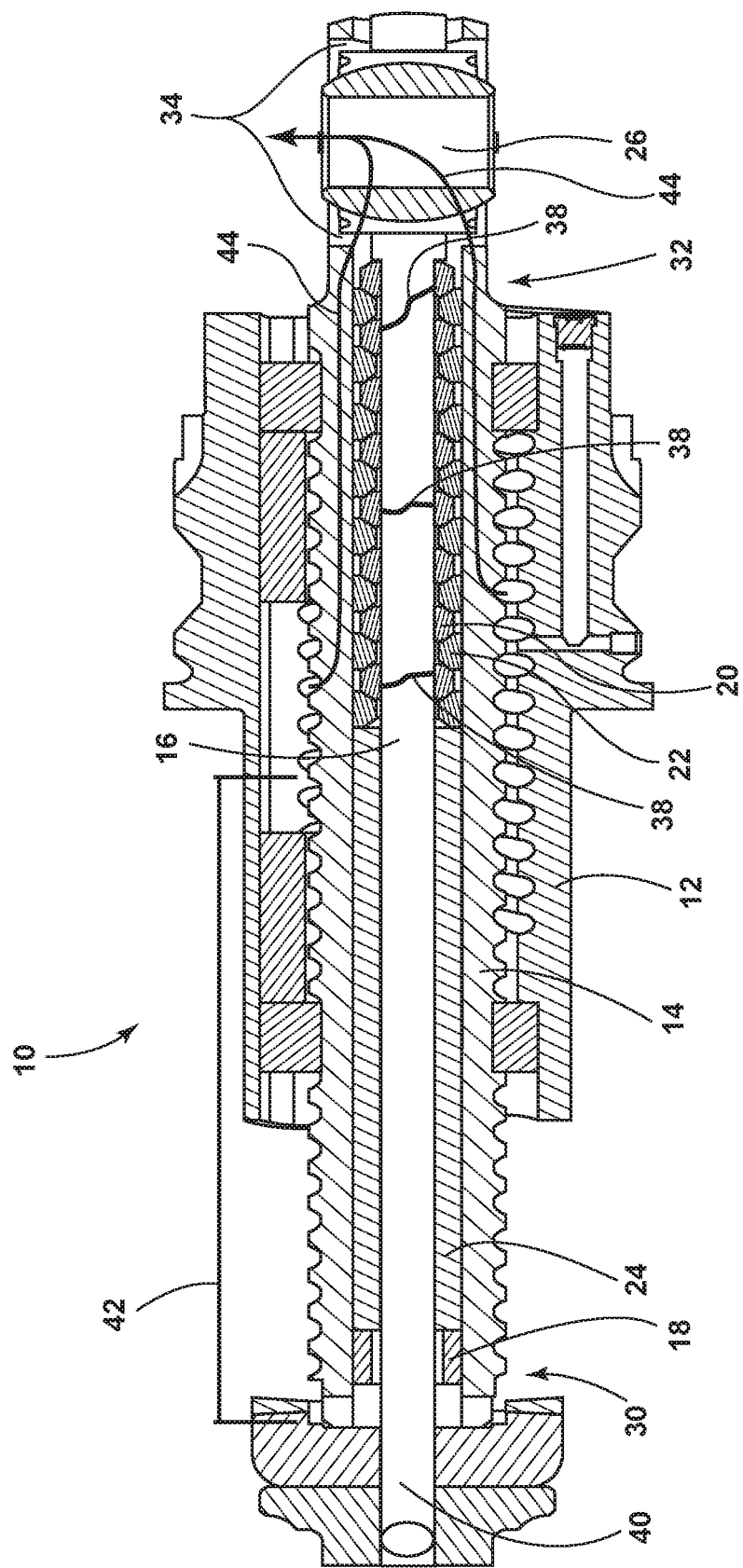
FIG. 4 is a cross-sectional view generally illustrating an embodiment of a linear actuator with a fractured tie rod according to teachings of the present disclosure.

In embodiments, such as generally illustrated in FIG. 4, in the event of a failure of the tie rod 16 (e.g., one or more fractures 38 along the tie rod 16), the friction springs 20, 22 may not be compressed (or may be compressed to a lesser degree) and may not divert/transfer loads from the ball screw 14 to the tie rod 16. In such an event, the gap 34 between the ball screw 14 and the bearing 26 may close, which may provide a visual indication of a failure in the primary load path 36. The ball screw 14 may be intact and may be configured to maintain a connection between the actuator 10 and the aircraft structure (e.g., loads may be transferred via a second secondary load path 44). The second secondary load path 44 may include the bearing 26 and the ball screw 14, and may not include the friction springs 20, 22 or the tie rod 16.

In embodiments, the friction springs 20, 22 may interconnect the primary load path 36 with the first secondary load path 40 and/or the second secondary load path 44, and may facilitate transition from the primary load 36 to the secondary load paths 40, 44 in the event of a failure of the ball screw 14 or the tie rod 16.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. An actuator, comprising:
   a housing;
   a ball screw engaged with the housing;
   a tie rod disposed in the ball screw;
   a plurality of friction springs in the ball screw and around the tie rod; and
   a bearing having an interference fit with the tie rod and a clearance fit with the ball screw.

2. The actuator according to claim 1, wherein the plurality of friction springs includes a plurality of outer friction springs and a plurality of inner friction springs, the outer friction springs having an outer diameter greater than an outer diameter of the inner friction springs.

3. The actuator according to claim 2, wherein the plurality of outer friction springs are arranged in an alternating configuration with the plurality of inner friction springs.

4. The actuator according to claim 2, wherein the outer friction springs have an interference fit with the ball screw.

5. The actuator according to claim 2, wherein the inner friction springs have an interference fit with the tie rod.

6. The actuator according to claim 1, wherein each of the plurality of friction springs has a C-shaped configuration.

7. The actuator according to claim 2, wherein the plurality of outer friction springs and the plurality of inner friction springs each has a C-shaped configuration.

8. The actuator according to claim 1, further comprising a spacer disposed between the tie rod and the ball screw.

9. The actuator according to claim 8, further comprising an adjusting nut disposed in the ball screw at or about an end thereof, the spacer being located between the adjusting nut and the plurality of friction springs.

10. The actuator according to claim 9, wherein the adjusting nut has external threads configured to engage with internal threads of the ball screw to enable axial movement of the adjusting nut.

11. The actuator according to claim 1, wherein the actuator is configured to transfer a load via a primary load path during a normal operation, via a first secondary load path when there is a fault with the ball screw, and via a second secondary load path when there is a fault with one of the tie rod.

12. The actuator according to claim 11, wherein the primary load path is from the ball screw to the outer friction springs, to the inner friction springs, to the tie rod, to a bearing, and into an external component.

13. The actuator according to claim 11, wherein the first secondary load path is from an intact portion of the ball screw to the tie rod, to the bearing, and into the external component.

14. The actuator according to claim 11, wherein the second secondary load path is from the ball screw to the bearing and into the external component.

15. A method comprising:
compressing a plurality of outer friction springs to create an interference fit with an inner diameter of a ball screw;
compressing a plurality of inner friction springs to create an interference fit with an outer diameter of a tie rod disposed within the ball screw;
transferring a load via a primary load path during a normal operation; and
transferring the load via a first secondary load path when there is a fault with the ball screw, and via a second secondary load path when there is a fault with one of the tie rod;
wherein the primary load path is from the ball screw to the outer friction springs, to the inner friction springs, to the tie rod, to a bearing, and into an external component;
wherein the first secondary load path is from an intact portion of the ball screw to the tie rod, to the bearing, and into the external component;
wherein the second secondary load path is from the ball screw to the bearing and into the external component; and
wherein the bearing has an interference fit with the tie rod and clearance fit with the ball screw.

16. The method according to claim 15, wherein the plurality of outer friction springs and the plurality of inner friction springs each has a C-shaped configuration.

17. The method according to claim 15, wherein:
compressing the plurality of outer friction springs includes expanding the outer friction springs in a radial direction to create the interference fit with the inner diameter of the ball screw; and
compressing the plurality of inner springs includes collapsing the inner friction springs in the radial direction to create the interference fit with the outer diameter of the tie rod.

18. The method according to claim 15, wherein compressing the plurality of outer friction springs and compressing the plurality of inner friction springs is caused by moving an adjusting nut located at or about an end of the ball screw to press a spacer disposed between the ball screw and the tie rod against the plurality of outer friction springs and plurality of inner friction springs.

19. The method according to claim 18, wherein the adjusting nut has external threads configured to engage with internal threads of the ball screw to enable axial movement of the adjusting nut.

20. An actuator, comprising:
a housing;
a ball screw engaged with the housing;
a tie rod disposed in the ball screw;
a plurality of outer friction springs having an interference fit with an inner diameter of the ball screw;
a plurality of inner friction springs having an interference fit with an outer diameter of the tie rod; and
a bearing having an interference fit with the tie rod and clearance fit with the ball screw;
wherein a load is transferred to an aircraft structure via a primary load path during a normal operation, via a first secondary load path when there is a fault with the ball screw, and via a second secondary load path when there is a fault with one of the tie rod;
wherein the primary load path is from the ball screw to the outer friction springs, to the inner friction springs, to the tie rod, to a bearing, and into the aircraft structure;
wherein the first secondary load path is from an intact portion of the ball screw to the tie rod, to the bearing, and into the aircraft structure; and
wherein the second secondary load path is from the ball screw to the bearing and into the aircraft structure.

\* \* \* \* \*